United States Patent Office 3,108,369
Patented Oct. 29, 1963

3,108,369
DIP BRAZING COMPOSITION FOR MAGNESIUM AND METHOD OF USE
Ronald D. Koeplinger, Saginaw, Mich., assignor to The Dow Chemical Company, Midland, Mich., a corporation of Delaware
No Drawing. Filed June 21, 1961, Ser. No. 125,896
6 Claims. (Cl. 29—488)

This invention is concerned with a dip brazing composition suitable for use with magnesium alloys and more particularly is concerned with a new and novel brazing paste and method for use with brazeable magnesium alloys.

In conventional practice, magnesium-based alloys having about 12 percent by weight aluminum and about 5 weight percent zinc normally are used as a filler material in the low temperature brazing of brazeable magnesium-based metals. These particular alloys are liquid and exhibit good capillary metal flow at the brazing temperatures, i.e. from about 1075 to about 1130° F., but in the solid state are quite brittle. Because of this brittleness they are expensive to manufacture and very difficult to form into strip and wire shapes needed for conventional dip brazing operations.

In these dip brazing operations component parts of magnesium alloy fabrications or assemblies to be brazed are held together; a strip or wire of the filler alloy formed to conform with the joint to be brazed is placed thereon; the entire assembly is preheated to about 800–900° F.; the so-heated unit is immersed in a flux bath maintained at a temperature of from about 1075 to 1130° F. at which temperature range the filler alloy melts and flows into the joint; and the unit is removed from the flux bath and cooled whereupon the filler material in the joint solidifies thereby fixedly joining the parts into a rigid unit.

It is a principal object of the present invention to provide a new and novel filler composition for use in brazing magnesium alloys and a method for its use which overcomes the disadvantages encountered in conventional magnesium brazing practices.

It is another object of the present invention to provide brazing compositions wherein the filler alloy is in a form which is easy and relatively inexpensive to prepare.

It is a further object of the present invention to provide a brazing paste for magnesium alloys that is easy to apply to a joint being brazed.

It is also an object of the present invention to provide a brazing composition utilizing only one form of filler metal thereby eliminating the need for stocking a variety of wire, strip and rod shaped fillers.

It is an additional object of the present invention to provide a brazing composition containing low melting magnesium based alloy fillers which, because of their limited cold workability when solid, cannot be easily prepared for use in conventional dip brazing processes for magnesium based metals.

These and other objects and advantages will become apparent from the detailed description presented hereinafter.

The composition of the instant invention is comprised of about 7 parts by weight magnesium alloy pellets, from about 2 to about 8 parts by weight of a particulate flux binder and sufficient liquid carrier to form the binder and filler into a paste or slurry. With a pellet:binder proportion containing less than 2 parts binder per 7 parts of pellets the composition tends to fall from the brazement while in the preheat furnace. At binder concentrations greater than set forth small metal fillets are obtained.

Magnesium alloy pellets suitable for use as filler materials are selected from those alloys which are molten at the temperature of the flux bath used for the brazing operation, i.e. a maximum temperature of about 1130° F. These include, for example, magnesium-aluminum-zinc ternary alloys containing from about 10 to about 15 weight percent aluminum, from about 5 to about 40 weight per cent zinc, balance magnesium. Additionally, cadmium containing alloys, wherein all or a part of the zinc present in the hereinbefore described ternary alloy has been replaced by cadmium, also are useful.

Pellets ranging in size from about 20 to about 320 mesh U.S. Standard Sieve series are suitable for use in the instant composition. Brazing pastes containing pellets which are larger than about 20 mesh tend to fall from the brazement while in the preheat stage. Pellets ranging from about 200 to about 320 mesh result in a very small fillet for the amount of paste applied and pellets smaller than about 320 mesh give substantially no fillet at all. Preferably, pellets ranging from about 60 to about 200 mesh will be utilized.

The binder for the brazing paste composition can be selected from any of a variety of particulate flux or flux-type materials which are molten or semi-molten at the temperatures employed for the preheating operation, i.e. from about 800 to about 850° F. These include for example a No. 230 flux (nominal composition 55% $KCl+34\%$ $MgCl_2+9\%$ $BaCl_2+2\%$ $CaF_2$), a No. 232 flux (nominal composition 37.5% $KCl+42\%$ $MgCl_2+8.5\%$ $CaF_2+7.5\%$ $MgO+4.5\%$ $BaCl_2$), a No. 310 flux (nominal composition 20% $KCl+50\%$ $MgCl_2+15\%$ $CaF_2+15\%$ $MgO$), a flux having a nominal composition of 53% $KCl+12\%$ $BaCl_2+1\%$ $CaF_2+34\%$ $MgCl_2$ and one having a nominal composition of 56% $KCl+6\%$ $CaCl_2+1\%$ $CaF_2+37\%$ $MgCl_2$. Additionally, zinc chloride, silver chloride, antimony chloride, copper chloride, lead chloride and other inorganic chloride salts which can react with magnesium to produce magnesium chloride and the free metal are satisfactory for use as binders in the instant composition.

Preferably the particulate binding material will be smaller than about 20 mesh, U.S. Standard Sieve Series, as compositions prepared from coarser particles do not readily adhere to the brazement while preheating the assembly. Desirably, the binder particles will range from about 60 to about 230 mesh.

The liquid carrier for combining the binder and filler into a paste or slurry can be any material which is liquid at room temperatures, is substantially chemically inert to the mix components, does not promote reaction between the binder and filler and has a boiling point below about 500° F.

Preferably the liquid carrier will be organic and will be selected from those materials which will undergo little or no carbonization in the preheat furnace and which do not volatilize rapidly at room temperature. Carriers suitable for use in the instant composition include, for example, aromatic hydrocarbons, e.g. benzene; alkyl aryl hydrocarbons, e.g. toluene, xylene; chlorinated aliphatic and aromatic hydrocarbons, e.g. carbon tetrachloride, perchloroethane, chlorobenzene; aliphatic hydrocarbons, e.g. decane, octane; mineral spirits, kerosene, symmetrical and mixed ethers, ketones and other oxygen containing organics; carbon bisulfide and the like. Mineral spirits is a very desirable carrier as it has a low volatilization rate at room temperature.

The amount of liquid carrier used is not critical but will be an amount to provide a slurry or paste when admixed with the binder and pellets. Ordinarily, the compositions as prepared will contain from about 20 to about 35 percent by weight of the carrier as based on the combined weights of the binder and pellets. Preferably, the carrier will be about 25 weight percent of the binder and pellet mixture weight. For pastes or slurries of a thin consistency, the larger amounts of carrier will be used while for thicker pastes smaller amounts of the carrier will be incorporated into the composition as is understood by one skilled in the art.

The brazing composition of the instant invention can be used for dip brazing any of the brazeable magnesium alloys. These include, for example, AZ31B, M1A, AM11, K1A, ZE10A and AZ10 as designated by ASTM nomenclature.

In general, the brazing process utilizing the instant composition is carried out as follows: (1) clean and deburr the magnesium alloy articles to be joined; (2) assemble parts to be brazed; (3) apply brazing composition to the joint being brazed; (4) preheat the assembly; (5) immerse preheated assembly in molten flux bath; (6) remove assembly from flux bath; (7) cool and clean rigidly affixed parts.

All of the surfaces to be joined should be thoroughly cleaned and be free of burrs. Dirt, oil and grease for example, can be removed by conventional vapor or solvent degreasing. Surface films, such as are produced by protective chromate treatments or oxide, hydroxide or other type corrosion products can be removed either by mechanical or chemical methods of cleaning. Mechanical cleaning and deburring is easily achieved by abrading the surface of the alloy parts with abrasive cloth, a grinding wheel, wire brush or steel wool, for example. Chemical methods of cleaning can be those suggested for magnesium practice and exemplified by the procedures set forth in the publication Magnesium Finishing published by The Dow Chemical Company, Midland, Michigan (1955).

The cleaned parts to be brazed can be assembled and held in place by a jig, clamp, tack welding, staking, self-locking joints and the like. For optimum results with the instant composition, a joint clearance of from about 0.01 to about 0.02 inch is recommended although clearances up to 0.03 inch or more give satisfactory brazings.

In applying the brazing paste to the joint, the amount of paste used should be enough to provide a uniform fillet along the joint and should not be of such an amount that a large excess of metal is obtained. Paste may be applied along the entire joint or at various positions along the joint such that capillary attraction will move the filler to these areas in which no filler is applied. The paste or slurry composition can be pre-mixed and stored prior to use, or, a dry formulation of binder and pellets can be admixed with the liquid carrier at the time of use. Alternatively, all components can be mixed together at the time of use if desired. The composition is applied to the joint by any of a variety of convenient means; e.g. brush, rod, spatula, extruded from a tube etc.

The assembly is preheated in a gas-fired or electrically heated furnace, oven or other preheater at a temperature of from about 800 to about 850° F. until the binder in the paste becomes molten, i.e. the paste is "mushy" when touched. If the assembly being brazed is removed from the preheater before the binder becomes molten, the paste sloughs off of the brazement as it is immersed in the flux treatment bath. Leaving the assembly in the preheater for a period of time after the binder has become molten promotes undesirable oxidation of the alloy pellets which if excessive will produce a rough fillet.

The preheated assembly is removed from the preheater and immersed in a molten brazing flux maintained at from about 1075 to about 1130° F. Preferably a No. 452 brazing flux (nominal composition KCl—42.5%, NaCl—10%, LiCl—37%, NaF—10% and $AlF_3 \cdot 3NaF$—0.5%) as set forth in Joining Magnesium, The Dow Chemical Company, Midland, Michigan (1956) maintained at from about 1080° to about 1130° F. depending on the composition of the base metals comprising the assembly is used for the brazing operation. The immersion time in the flux bath varies from about 30 seconds to about 3 minutes, the length of time varying directly with the mass of the assembly.

The post-braze cleaning is carried out as follows: The brazed assembly is removed from the flux bath, cooled to about 600° F. and immersed in warm or hot water. The assembly is scrubbed, while in the bath, with a stiff-bristled brush to remove surface flux therefrom. Preferably, running water is used in the bath during the scrubbing to insure no build up of dissolved chloride in the bath which could attack the magnesium alloy. The scrubbed assembly is then chemically cleaned, immersed for about 2 hours in a boiling aqueous solution containing about 5% by weight sodium dichromate, rinsed in cold running water and dipped in boiling water as suggested in Joining Magnesium, pages 116–117. Other methods for cleaning and chemically treating the brazed assembly as known to one skilled in the art can be substituted for those described herein.

The following examples will serve to illustrate further the present invention but are not meant to limit it thereto.

EXAMPLE 1

Pellets of −100 +115 mesh (U.S. Standard Sieve) ASTM designated AZ125XA magnesium based alloy (nominal composition 11–13% Al, 4.5–5.5% Zn, 0.1–0.3% Mn, balance Mg) were mixed with −100 +200 mesh No. 230 flux binder to prepare a number of compositions over the range of about 7 parts by weight pellets and from about 0.5 to about 9 parts by weight flux. Sufficient mineral spirits (U.S.P. grade) was added to each of the pellet-binder mixtures to make a thick paste.

An inverted T-shaped assembly was fabricated by placing a 2 inch long section of U-shaped M1A or AZ31B magnesium alloy tubing (½ inch long arms—⅝ inch wide base and 1/16 inch wall thickness) onto a 2 by 2 inch square of ⅛ inch thick sheet of the same material. The tubing was inverted so that the ends of the arms faced the sheet. All surfaces to be brazed were sanded with 320 grit Aloxite cloth and abraded with steel wool. The U-shaped member was approximately centered on the sheet and tack-welded at the tube ends to hold it in position but attached so as to leave a clearance of about 0.01 inch in the joint to be brazed. A layer of brazing paste was brushed onto the joints at the junction of the outside edges of the tube arms and the sheet surface.

The assembly was positioned vertically with respect to the base plate in a preheat furnace maintained at about 800–850° F. and kept there until the flux binder of the paste became molten. The assembly then was removed from the preheat furnace and immersed for about 1½ minutes in a molten bath of No. 452 brazing flux maintained at about 1100° F. Following removal of the so-treated assembly from the flux bath, the inverted T-shaped united was cooled to about 600° F., quenched in warm water and cleaned as described hereinbefore.

The results of this series of tests are presented in Table I which follows:

Table I

| Run No. | Pellet:Binder (weight ratio) | Results |
|---|---|---|
| 1 | 7:0.5 | Substantially all of the brazing paste fell off joint in preheat furnace. |
| 2 | 7:1 | About half of paste fell off joint in preheat furnace. |
| 3 | 7:2 | Good adhesion of paste, good fillet. |
| 4 | 7:3 | Do. |
| 5 | 7:4 | Do. |
| 6 | 7:7 | Do. |
| 7 | 7:8 | Good adhesion of paste, fillet small for amount of paste used on joint. |
| 8 | 7:9 | Good adhesion of paste, fillet very small for amount of paste used on joint. |

EXAMPLE 2

Using the same procedure and inverted T-shaped brazing assemblies as described for Example 1, a number of tests were run to evaluate the effectiveness of different metal halides as a binder in the instant brazing paste compositions.

The brazing paste was comprised of 100–200 mesh AZ125XA magnesium alloy pellets and —100 mesh binder using a 7:2 weight ratio of pellets to binder. Toluene was used as the liquid vehicle.

The results of these tests are presented in Table II which follows:

Table II

| Run No. | Binder Salt | Brazing Result |
|---|---|---|
| 1 | $AlCl_3$ | Small fillet formed. |
| 2 | $SbCl_3$ | Good Fillet. |
| 3 | $CuCl_2$ | Do. |
| 4 | $PbCl_2$ | Do. |
| 5 | $MnCl_2$ | Fillet formed, but rough area where pellets were applied. |
| 6 | $NiCl_2$ | Small fillet formed. |
| 7 | $AgCl$ | Good fillet. |
| 8 | $ZnCl_2$ | Good fillet, but excessive diffusion into base metal. |

In a separate study utilizing the same technique and test specimens, a number of flux formulations were tested as binders. For these tests, alloy pellets screened to 100–115 mesh were used in the brazing paste.

Table III summarizes the results of these tests.

Table III

| Run No. | Binder | Results |
|---|---|---|
| 1 | No. 222 Flux (95% $BaCl_2$, 5% $CaF_2$). | Small fillet. |
| 2 | No. 230 Flux (55% KCl, 9% $BaCl_2$, 2% $CaF_2$, 34% $MgCl_2$). | Acceptable metal flow, good fillet. |
| 3 | No. 232 Flux (37.5% KCl, 4.5% $BaCl_2$, 8.5% $CaF_2$, 42% $MgCl_2$, 7.5% $MgO$). | Do. |
| 4 | No. 250 Flux (23% KCl, 2.5% $BaCl_2$, 2.5% $CaF_2$, 72% $MnCl_2$). | Rough area where pellets were applied. |
| 5 | No. 310 Flux (20% KCl, 15% $CaF_2$, 50% $MgCl_2$, 15% $MgO$). | Acceptable metal flow, good fillet. |
| 6 | (62% KCl, 38% $MgCl_2$) | Small fillet. |
| 7 | (27% KCl, 73% $ZnCl_2$) | Acceptable metal flow but some diffusion of filler metal into base metal. |
| 8 | (16% NaCl, 84% $ZnCl_2$) | Acceptable metal flow, but diffusion of filler metal into base metal. |
| 9 | (53% KCl, 12% $BaCl_2$, 1% $CaF_2$, 34% $MgCl_2$). | Acceptable metal flow, good fillet. |
| 10 | (56% KCl, 6% $BaCl_2$, 1% $CaF_2$, 37% $MgCl_2$). | Do. |

EXAMPLE 3

A brazing paste composition was prepared using —200 mesh No. 230 flux as a binder, AZ125XA pellets as filler and mineral spirits as a carrier. The weight ratio of pellets to binder in the paste was 7:3. A number of inverted T-joint assemblies were brazed following the procedure set forth in Example 1 wherein the pellet size distribution in the paste was varied from run to run. For these tests brazes were made on specimens positioned both horizontally and vertically, with respect to the base plate in the preheat furnace.

The results of these tests are presented in Table IV.

Table IV

| Run No. | Pellet Size (U.S. Standard Sieve) Mesh | Results |
|---|---|---|
| 1 | —20 +40 | Fillet obtained on horizontally positioned specimen, but composition fell off of vertical specimen in preheat furnace. Very coarse mix. |
| 2 | —40 +60 | Fillet obtained on assemblies in both positions, but a small amount of composition fell off of vertical specimen in preheat furnace. Coarse mix. |
| 3 | —60 +80 | Satisfactory fillet, but mix was coarse. |
| 4 | —80 +100 | Good fillet, but mix was a little too coarse for easy spreading. |
| 5 | —100 +115 | Good fillet, mix consistency good. |
| 6 | —115 +140 | Do. |
| 7 | —140 +170 | Do. |
| 8 | —170 +200 | Do. |
| 9 | —200 +230 | Acceptable fillet but was small as based on the amount of paste applied to the joint. |
| 10 | —230 +320 | Very small fillet. |
| 11 | —320 | Composition sloughed off in molten flux bath. |

EXAMPLE 4

Following the brazing procedure described for Example 1 and using both horizontally and vertically positioned inverted T-shaped assemblies, a number of tests were run to determine the effect of binder particle size in the brazing paste composition.

Brazing pastes were prepared from —100 +115 mesh AZ125XA pellets, No. 230 flux and mineral spirits carrier utilizing a 7:3 weight ratio of pellets to flux. In each of the compositions the particle size range of the binder was varied. Results are summarized in Table V which follows:

Table V

| Run No. | Flux Size (U.S. Standard Sieve) Mesh | Results |
|---|---|---|
| 1 | —20 +40 | Substantially all of paste fell from vertically positioned sample in preheat furnace. |
| 2 | —40 +60 | About half of the paste fell from the vertically positioned sample in the preheat furnace. |
| 3 | —60 +80 | Very good fillets on both specimens. |
| 4 | —80 +100 | Do. |
| 5 | —100 +200 | Do. |
| 6 | —200 | Do. |

In a manner similar to that described for the foregoing examples, and, using alloy pellets within the range of from about 60–200 mesh, a particulate binder smaller than about 60 mesh (both U.S. Standard Sieve), and composition ranges as set forth hereinbefore, a brazing paste containing magnesium alloy pellets (nominal composition about 10 weight percent aluminum, 20 weight percent zinc, balance magnesium), No. 232 flux binder and benzene carrier can be used to braze AM11 alloy. A thick slurry having alloy pellets (nominal composition about 12 weight percent aluminum, 10 weight percent zinc, balance magnesium), No. 310 flux binder and a xylene carrier can be used to braze an assembly of ZE10 alloy. A paste with pellets of an alloy containing by weight 15% aluminum, 40% zinc, balance magnesium, zinc chloride and carbon tetrachloride can be used on AZ10A brazements. Pellets of 15% aluminum, 15% zinc, balance magnesium, a binder containing about 53% KCl+12% $BaCl_2$+1% $CaF_2$+34% $MgCl_2$ and decane can be made into a paste and used to braze M1A alloy. Pellets of 5% aluminum, 5% zinc, balance magnesium bound with antimony chloride (III) into a paste using dibutyl ether carrier can be used to braze K1A alloy. An assembly of AZ31B-0 and M1A pieces can be joined using a brazing paste comprising alloy pellets (nominal composition 12 weight percent aluminum, 3 weight percent zinc, 3 weight percent cadmium, balance magnesium) No. 230 flux binder and mineral spirits as a carrier. A paste composed of aluminum (15 weight percent), cadmium (5 weight percent) and magnesium (balance) alloy pellets, a binder having a nominal composition of 56% KCl+6% CaCl+1% CaF$_2$+37% MgCl$_2$, and xylene carrier can be used to braze AZ10 alloy. A paste prepared from aluminum—12 weight percent, cadmium—30 weight percent, magnesium—balance, CuCl$_2$ flux binder and kerosene as a carrier can be used as a brazing composition with ZE10A assemblies.

Each of the above-listed brazing paste or slurry constituents as well as others listed hereinbefore can be blended with any two of the other stated mix components to give a paste or slurry suitable for use in brazing any of the brazeable magnesium based alloys.

Various modifications can be made in the present invention without departing from the spirit or scope thereof for it is understood that I limit myself only as defined in the appended claims.

I claim:

1. A brazing composition for joining brazeable magnesium alloys which consisting essentially of; about 7 parts by weight magnesium alloy pellets, from about 2 to about 8 parts by weight of a particulate binder, and an amount of a volatile liquid carrier to provide a paste when admixed with said binder and said pellets, said alloy pellets ranging in size from about 20 to about 320 mesh U.S. Standard Sieve and being a member selected from the group of magnesium alloys containing from about 10 to about 15 weight percent aluminum, from about 5 to about 40 weight percent of a member selected from the group consisting of zinc, cadmium, binary mixtures and binary alloys thereof and the balance substantially magnesium, said binder being a flux material molten at magnesium brazing temperatures and being composed substantially of particles smaller than 20 mesh U.S. Standard Sieve and said liquid carrier being substantially inert to said flux material and said pellets and having a maximum boiling point of about 500° F.

2. The brazing composition as defined in claim 1 wherein the magnesium alloy pellets range from about 60 to about 200 mesh U.S. Standard Sieve and have a nominal composition of from about 11 to about 13 weight percent aluminum, about 4.5 to about 5.5 weight percent zinc, about 0.1 to about 0.3 weight percent manganese, balance substantially magnesium.

3. The brazing composition as defined in claim 1 wherein the particulate binder ranges from about 60 to about 230 mesh U.S. Standard Sieve and has a nominal composition of about 55 weight percent KCl, 34 weight percent MgCl$_2$, 9 weight percent BaCl$_2$ and 2 weight percent CaF$_2$.

4. The brazing composition as defined in claim 1 wherein the weight proportion of alloy pellets to binder is about 7:3.

5. The brazing composition as defined in claim 1 wherein the liquid carrier is mineral spirits and wherein the amount of said carrier ranges from about 20 to about 35 percent of the combined weight of the alloy pellet-binder mixture.

6. In the method of brazing magnesium alloys, the improvement which comprises: (1) applying a brazing composition to the cleaned joint of the magnesium articles to be brazed, said composition essentially consisting of about 7 parts by weight of magnesium alloy pellets, from about 2 to about 8 parts by weight of a particulate binder flux material and a liquid carrier in an amount to provide a paste when admixed with said magnesium alloy pellets and said binder flux material, said pellets ranging from about 20 to about 320 mesh and having a composition of about 10 to 15 weight percent aluminum, about 5 to 40 weight percent of a member selected from the group consisting of zinc, cadmium, binary mixtures and zinc-cadmium binary alloys, balance substantially magnesium, said binder composed substantially of particles smaller than 20 mesh U.S. Standard Sieve and being molten at brazing preheat temperature employed and said carrier being substantially inert to said flux material and said pellets and having a maximum boiling point of about 500° F., (2) placing the assembly in a preheater maintained at a temperature of from about 800 to about 850° F., (3) heating the assembly in said preheater until said flux binder becomes molten, (4) removing the assembly from said preheater and immersing the preheated assembly in a molten brazing flux for magnesium alloy maintained at from about 1075° to about 1130° F. for a period of from about 30 seconds to about 3 minutes, (5) removing the assembly from the flux bath, cooling and post-brazing cleaning the brazed assembly.

References Cited in the file of this patent

UNITED STATES PATENTS

| | | |
|---|---|---|
| 1,704,539 | Karmazin | Mar. 5, 1929 |
| 2,833,030 | Peaslee | May 6, 1958 |
| 2,908,072 | Johnson | Oct. 13, 1959 |